(12) United States Patent
Jiang et al.

(10) Patent No.: US 11,620,344 B2
(45) Date of Patent: Apr. 4, 2023

(54) FREQUENT ITEM SET TRACKING

(71) Applicant: Honeywell International Inc., Morris Plains, NJ (US)

(72) Inventors: Peng Jiang, Beijing (CN); Yan Guang Zhang, Beijing (CN); ZhenJun Mei, Beijing (CN); Nan Li, Beijing (CN); Muli Liu, Beijing (CN); Yan Xia, Beijing (CN); Xin Zhang, Beijing (CN); Yi Sun, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 531 days.

(21) Appl. No.: 16/809,304

(22) Filed: Mar. 4, 2020

(65) Prior Publication Data
US 2021/0279278 A1  Sep. 9, 2021

(51) Int. Cl.
G06F 16/906 (2019.01)
G06F 16/908 (2019.01)
G08B 25/14 (2006.01)
G08B 25/00 (2006.01)

(52) U.S. Cl.
CPC .......... *G06F 16/906* (2019.01); *G06F 16/908* (2019.01); *G08B 25/007* (2013.01); *G08B 25/14* (2013.01)

(58) Field of Classification Search
None
See application file for complete search history.

(56) References Cited

U.S. PATENT DOCUMENTS

| 2007/0272744 A1 | 11/2007 | Bantwal et al. |
| 2016/0187911 A1 | 6/2016 | Carty et al. |
| 2017/0019312 A1* | 1/2017 | Meyer .............. G06N 20/00 |

FOREIGN PATENT DOCUMENTS

| CN | 103927398 A | 7/2014 |
| CN | 107430387 A | 12/2017 |

OTHER PUBLICATIONS

Chikhaoui et al.; A New Algorithm Based on Sequential Pattern Mining for Person Identification in Ubiquitous Environments, SensorKDD'10, Jul. 25, 2010, Washington, DC, ACM, 10 pages, 2010.

* cited by examiner

*Primary Examiner* — Baoquoc N To
(74) *Attorney, Agent, or Firm* — Seager, Tufte & Wickhem, LLP

(57) ABSTRACT

A new transaction set is compared to a plurality of transaction sets represented in a Compressed Frequent Item Set (CFIS), wherein the CFIS maintains a count for each transaction set represented in the CFIS. When the new transaction set matches a transaction set represented in the CFIS, the count for the matching transaction set in the CFIS is incremented. When the new transaction set does not match any transaction sets represented in the CFIS, the new transaction set is added to the CFIS. If there are intersections between two or more events of the new transaction set and the events of the plurality of transaction sets represented in the CFIS, the count for the transaction sets in the CFIS that intersect with two or more of the events of the new transaction set is incremented.

20 Claims, 13 Drawing Sheets

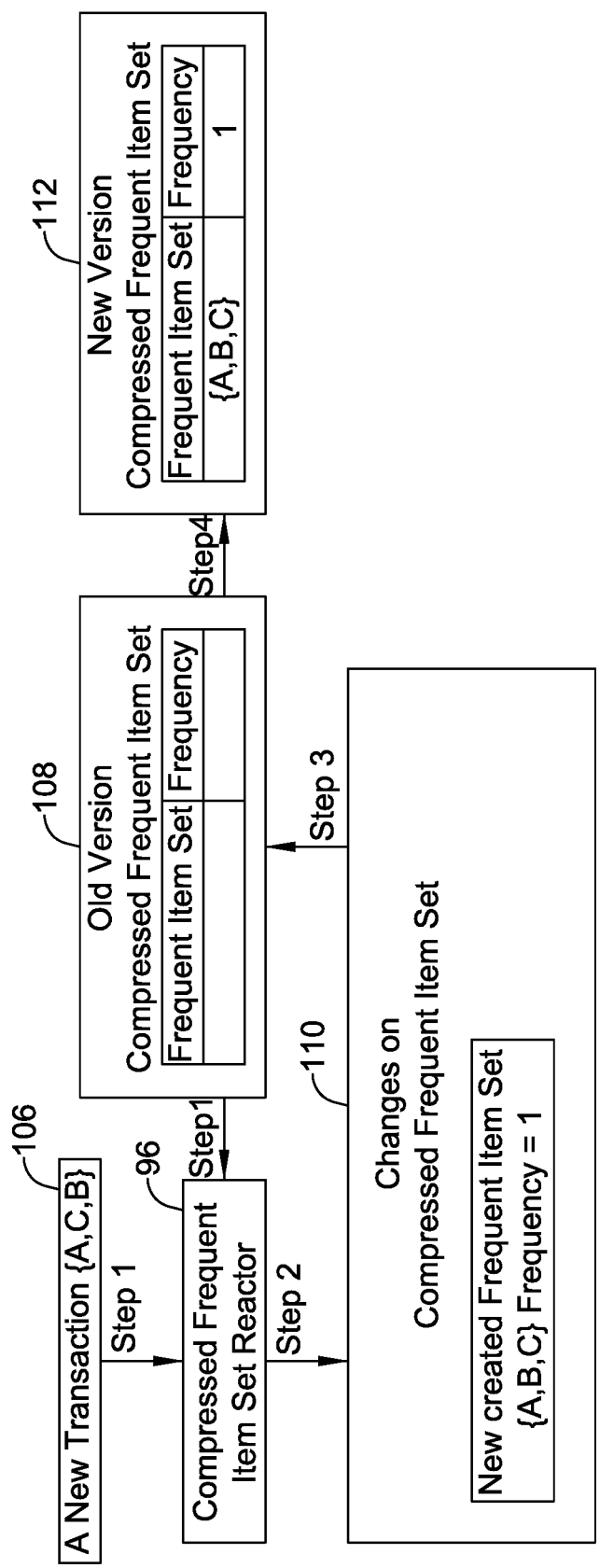

| Line | Pseudo code | Happened in this transaction |
|---|---|---|
| 01 | FeedANewTransaction(newTransaction) | {A,C,B}->{A,B,C} |
| 02 | Sort(newTransaction) | |
| 03 | React with All Old CFIS | |
| 04 | For each OldCFIS in AllOldCFIS | |
| 05 | compare(newTransactin,OldCFIS)=>CompareResultList | |
| 06 | For each compareResult in CompareResultList | |
| 07 | If(compareResult.type==0||1) | |
| 08 | If(compareResult.intersection does not exist in ChangsCFIS) | |
| 09 | add intersection into ChangesCFIS(Frequency+1)(enrich tag) | |
| 10 | Else if (compareResult.type==3) | |
| 11 | If(compareResult.intersection does not exist in ChangsCFIS) | |
| 12 | add intersection into ChangesCFIS(Frequency+1)(new created tag) | |
| 13 | Else if (compareResult.type==3) | |
| 14 | If(compareResult.intersection does not exist in ChangsCFIS) | |
| 15 | If(compareResult.intersection does not exist in AllOldCFIS) | |
| 16 | add intersection into ChangesCFIS(Frequency+1)(new created tag) | |
| 17 | Else | |
| 18 | add intersection into ChangesCFIS(Frequency+1)(enrich tag) | |
| 19 | Apply ChangesCFIS to AllOldCFIS (enrich or create new) | |
| 20 | Sort(AllOldCFIS) by Frequency Desc if needed | |
| 21 | If(newTransaction does not exist in AllOldCFIS and also not in ChangesCFIS) | |
| 22 | Append new Transaction to AllOldCFIS and its Frequency is 1 | Append {A,B,C}.Frequency = 1 to AllOldCFIS |

FIG. 7

| Line | Pseudo code | Happened in this transaction |
|---|---|---|
| 01 | FeedANewTransaction(newTransaction) | |
| 02 | Sort(newTransaction) | |
| 03 | React with All Old CFIS | |
| 04 | For each OldCFIS in AllOldCFIS | Compare {A,B,D}with{A,B,C} |
| 05 | compare(newTransactin,OldCFIS)=>CompareResultList | {A,B,D} and {A,B,C} has intersection {A,B} Frequency={A,B,C}.Frequency+1=1+1=2 |
| 06 | For each compareResult in CompareResultList | |
| 07 | If(compareResult.type==0||1) | |
| 08 | If(compareResult.intersection does not exist in ChangsCFIS | |
| 09 | add intersection into ChangesCFIS(Frequency+1)(enrich tag) | |
| 10 | Else if (compareResult.type==3) | |
| 11 | If(compareResult.intersection does not exist in ChangsCFIS | |
| 12 | add intersection into ChangesCFIS(Frequency+1)(new created tag) | |
| 13 | Else if (compareResult.type==3) | {A,B,D} and {A,B,C} has intersection {A,B} |
| 14 | If(compareResult.intersection does not exist in ChangesCFIS | {A,B} is not in ChangesCFIS |
| 15 | If(compareResult.intersection does not exist in AllOldCFIS | {A,B} is also not in AllOldCFIS |
| 16 | add intersection into ChangesCFIS(Frequency+1)(new created tag) | Add{A,B} to ChangesCFIS with new created tag |
| 17 | Else | |
| 18 | add intersection into ChangesCFIS(Frequency+1)(enrich tag) | |
| 19 | Apply ChangesCFIS to AllOldCFIS (enrich or create new) | |
| 20 | Sort(AllOldCFIS) by Frequency Desc if needed | |
| 21 | If(newTransaction does not exist in AllOldCFIS and also not in ChangesCFIS) | |
| 22 | Append new Transaction to AllOldCFIS and its Frequency is 1 | Append {A,B,C}.Frequency = 1 to AllOldCFIS |

| Line | Pseudo code | Happened in this transaction |
|---|---|---|
| 01 | FeedANewTransaction(newTransaction) | |
| 02 | Sort(newTransaction) | |
| 03 | React with All Old CFIS | |
| 04 | For each OldCFIS in AllOldCFIS | Compare{A,B}with{{A,B},{A,B,C},{A,B,D}} |
| 05 | compare(newTransactin,OldCFIS)=>CompareResultList | {A,B} equals to {A,B} Frequency={A,B}.Frequency+1=2+1=3 {A,B} is contained by {A,B,C} Frequency={A,B,C}.Frequency+1=1+1=2 {A,B} is contained by {A,B,D} Frequency={A,B,D}.Frequency+1=1+1=2 |
| 06 | For each compareResult in CompareResultList | Loop above 3 compare results |
| 07 | If(compareResult.type==0||1) | {A,B} equals to {A,B} |
| 08 | If(compareResult.intersection does not exist in ChangsCFIS) | {A,B} is not in ChangesCFIS |
| 09 | add intersection into ChangesCFIS(Frequency+1)(enrich tag) | Add {A,B} to ChangeCFIS with enrich tag |
| 10 | Else if (compareResult.type==3) | {A,B} is contained by {A,B,C} and {A,B,D} |
| 11 | If(compareResult.intersection does not exist in ChangsCFIS) | {A,B} is already in ChangesCFIS |
| 12 | add intersection into ChangesCFIS(Frequency+1)(new created tag) | |
| 13 | Else if (compareResult.type==3) | |
| 14 | If(compareResult.intersection does not exist in ChangsCFIS) | |
| 15 | If(compareResult.intersection does not exist in AllOldCFIS) | |
| 16 | add intersection into ChangesCFIS(Frequency+1)(new created tag) | |
| 17 | Else | |
| 18 | add intersection into ChangesCFIS(Frequency+1)(enrich tag) | Enrich{A,B}.Frequency=2+1 in AllOldCFIS |
| 19 | Apply ChangesCFIS to AllOldCFIS (enrich or create new) | {A,B} is already in ChangesCFIS |
| 20 | Sort(AllOldCFIS) by Frequency Desc if needed | |
| 21 | If(newTransaction does not exist in AllOldCFIS and also not in ChangesCFIS) | {A,B} is already in ChangesCFIS |
| 22 | Append new Transaction to AllOldCFIS and its Frequency is 1 | |

FIG. 13

| Line | Pseudo code | Happened in this transaction |
|---|---|---|
| 01 | FeedANewTransaction(newTransaction) | |
| 02 | Sort(newTransaction) | |
| 03 | React with All Old CFIS | |
| 04 | For each OldCFIS in AllOldCFIS | Compare{A,B,C,E}w/{A,B},{A,B,C},{A,B,D} |
| 05 | compare(newTransactin,OldCFIS)=>CompareResultList | {A,B,C,E} contains {A,B} Frequency={A,B}.Frequency+1=3+1=4 {A,B,C,E} contains {A,B,C} Frequency={A,B,C}.Frequency+1=1+1=2 {A,B,C,E}and{A,B,D} has intersection{A,B} Frequency={A,B,D}.Frequency+1=1+1=2 |
| 06 | For each compareResult in CompareResultList | Loop above 3 compare results |
| 07 | If(compareResult.type==0||1) | {A,B,C,E} contains {A,B} {A,B,C,E} contains {A,B,C} |
| 08 | If(compareResult.intersection does not exist in ChangsCFIS | {A,B} is not in ChangesCFIS {A,B,C} is not in ChangesCFIS |
| 09 | add intersection into ChangesCFIS(Frequency+1)(enrich tag) | Add {A,B} to ChangesCFIS with enrich tag Add {A,B,C} to ChangesCFIS with enrich tag |
| 10 | Else if (compareResult.type==3) | |
| 11 | If(compareResult.intersection does not exist in ChangesCFIS | |
| 12 | add intersection into ChangesCFIS(Frequency+1)(new created tag) | |
| 13 | Else if (compareResult.type==3) | {A,B,C,E} and {A,B,D} has intersection {A,B} |
| 14 | If(compareResult.intersection does not exist in AllOldCFIS | {A,B} is already in ChangesCFIS |
| 15 | add intersection into ChangesCFIS(Frequency+1)(new created tag) | |
| 16 | Else | |
| 17 | add intersection into ChangesCFIS(Frequency+1)(enrich tag) | |
| 18 | Apply ChangesCFIS to AllOldCFIS (enrich or create new) | Enrich{A,B}.Frequency=3+1 in AllOldCFIS Enrich{A,B,C}.Frequency=1+1 in AllOldCFIS |
| 19 | Sort(AllOldCFIS) by Frequency Desc if needed | Sort AllOldCFIS by Frequency |
| 20 | If(newTransaction does not exist in AllOldCFIS and also not in ChangesCFIS) | |
| 21 | Append new Transaction to AllOldCFIS and its Frequency is 1 | Append {A,B,C,E}.Freq=1 to AllOldCFIS |

FREQUENT ITEM SET TRACKING

TECHNICAL FIELD

The present disclosure relates generally to finding relationships within transactional data. More particularly, the present disclosure relates to methods and systems for finding relationships between transaction sets of transactional data, where each transaction set includes two or more events.

BACKGROUND

Building systems such as Building Information Model (BIM) or a Building Management System (BMS) can provide substantial amounts of data pertaining to building events, alarms and the like. However, due to the vast quantities of data, it can be difficult to find relationships between individual events, individual alarms and the like. Accordingly, there is a need for improved methods and systems for finding relationships between building-related events.

SUMMARY

The present disclosure relates generally to methods and systems for finding relationships between building-related events. While analyzing building-related events, alarms and the like is used as an example, it is contemplated that the present disclosure may be applied to a wide variety of domains to efficiently find relationships such as Frequent-Item-Sets in transaction data.

An illustrative method of analyzing transactional data includes receiving a new transaction set from a source of transactional data. The new transaction set is compared to a plurality of transaction sets represented in a Compressed Frequent Item Set (CFIS), wherein the CFIS maintains a count for each transaction set represented in the CFIS and wherein the count represents a number of times that the corresponding transaction set in the CFIS has been encountered. When the new transaction set matches a transaction set represented in the CFIS, the count for the matching transaction set in the CFIS is incremented. When the new transaction set does not match any transaction sets represented in the CFIS, the new transaction set is added to the CFIS. A determination is made as to whether there are intersections between two or more events of the new transaction set and the events of the plurality of transaction sets represented in the CFIS, and if so, the count for the transaction sets in the CFIS that intersect with two or more of the events of the new transaction set is incremented.

In another example, an illustrative method of analyzing transactional data to find relationships between individual components of the transactional data includes receiving a series of new transaction sets from a source of transactional data. The series of new transaction sets is used to train a Compressed Frequent Item Set (CFIS) that includes a series of Frequent Item Sets (FIS), where each FIS is either a unique transaction set with a frequency equal to 1 or an intersection with the unique transaction with its maximum frequency. Compressed means that there are never two FISs having the same frequency, and each FIS has a proper subset relationship. A particular Item Set to search the CFIS for is received from a user. An FIS that includes the particular Item Set as a subset thereof is found. A support value for a relationship between the particular Item Set and the FIS that includes the particular Item Set as a subset thereof is calculated. A confidence value for the relationship between the particular Item Set and the FIS that includes the particular Item Set as a subset thereof is calculated.

In another example, an illustrative method of analyzing transactional data to find relationships between individual components of the transactional data includes receiving a series of new transaction sets from a Building Information Model (BIM) or a Building Management System (BMS). The series of new transaction sets are used to train a Compressed Frequent Item Set (CFIS) that includes a series of Frequent Item Sets (FIS), where each FIS is either a unique transaction set with a frequency equal to 1 or an intersection with the unique transaction with its maximum frequency. Compressed means that there are never two FISs having the same frequency, and each FIS has a proper subset relationship. A particular Item Set to search the CFIS for is received from a user. An FIS that includes the particular Item Set as a subset thereof is found. A support value for a relationship between the particular Item Set and the FIS that includes the particular Item Set as a subset thereof is calculated.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 6 is a schematic block diagram showing a first transaction in an example of transaction data analysis carried out by the illustrative transaction data analysis system of FIG. 5;

FIG. 7 shows pseudo code that may be used in implementing the first transaction shown in FIG. 6;

FIG. 9 shows pseudo code that may be used in implementing the second transaction shown in FIG. 6;

FIG. 11 shows pseudo code that may be used in implementing the third transaction shown in FIG. 6;

FIG. 13 shows pseudo code that maybe used in implementing the fourth transaction shown in FIG. 6.

Figure 1:
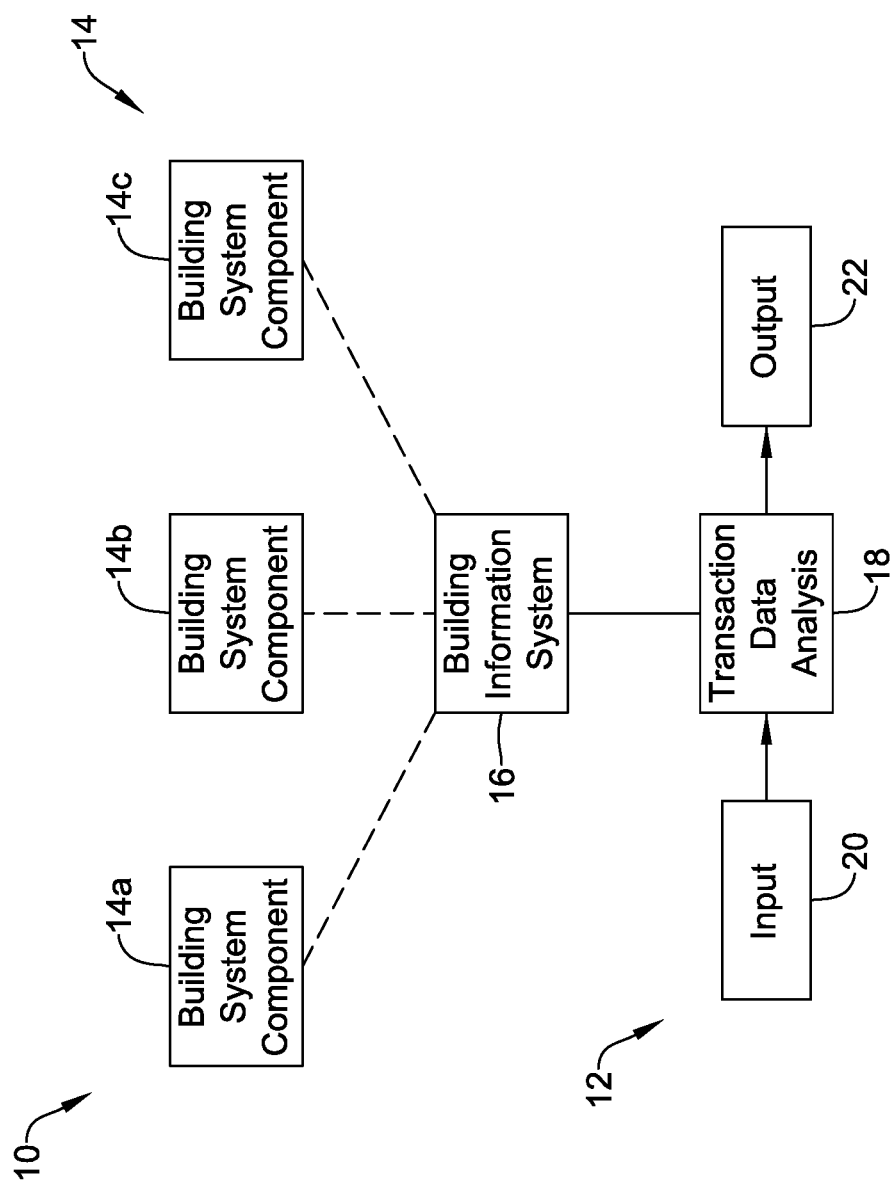
FIG. 1 is a schematic block diagram of a building system including an illustrative transaction data analysis system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a building system 10 and an illustrative transactional data analysis system 12 that is configured to receive transactional data from the building system 10. As generally shown, the building system 10 includes a number of building system components 14 that are individually labeled as building system component 14a, building system component 14b and building system component 14c. It will be appreciated that this is merely illustrative, as the building system 10 may include any number of different building system components 14. If the building system 10 is for an example a Heating, Ventilating and Air Conditioning (HVAC) system, the individual building system components 14 may represent heating sources, cooling sources, Variable Air Volume (VAV) boxes, controllers for components of the HVAC system, and the like. These are just examples.

The building system 10 also includes a building information system 16. The building information system 16 may collect operational data from the building system components 14. In some cases, the building information system 16 may also control operation of at least some functionality of at least some of the building system components 14. The building information system 16 may include setup and configuration settings for each of the building system components 14. In some cases, the building information system 16 may represent a Building Information Model (BIM). The building information system 16 may, for example, represent a Building Management System (BMS). The building information system 16 may be configured to output data such as transactional data to the data analysis system 12. In some cases, the data analysis system 12 may be configured to monitor the building information system 16 and/or to selectively request particular types of data, such as but not limited to transactional data, from the building information system 16 for subsequent analysis of the data.

The illustrative data analysis system 12 may analyze data from the building information system 16 to look for relationships between particular data points. In some cases, the data analysis system 12 may include a transaction data analysis block 18. The transaction data analysis block 18 may be configured to analyze transaction data that includes transaction sets, where each transaction set includes two or more events. The transaction data analysis block 18 may look for relationships between specific events or sets of specific events that are contained within two or more different transaction sets. These events may be any of a variety of different events. Examples include various equipment alarms, temperature alarms and the like. While analyzing building-related events, alarms and the like is used as an example here, it is contemplated that the present disclosure may be applied to a wide variety of domains to efficiently find relationships such as Frequent-Item-Sets in transaction data.

In some cases, the data analysis system 12 includes an input block 20 and an output block 22. The input block 20 may be used by a user to enter information, including information that will ultimately be stored within the building information system 16. In some cases, the input block 20 may be used by a user to request a particular analysis, such as requesting guidance as to which secondary alarms tend to follow a particular primary alarm, for example. The input block 20 may include a keyboard, a touch pad or other data entry mechanisms. The output 22 may be used by the data analysis system 12 to output relationships that are found between particular data points. The output block 22 may include a display, a printer or other data publishing mechanisms. In some cases, the transaction data analysis block 18, the input block 20 and the output block 22 may together be manifested in a computer or a computer system. The computer or computer system may be a desktop computer or a laptop computer. In some cases, the computer or computer system may be or include a remote server such as a cloud-based server, but this is not required.

Figure 2:
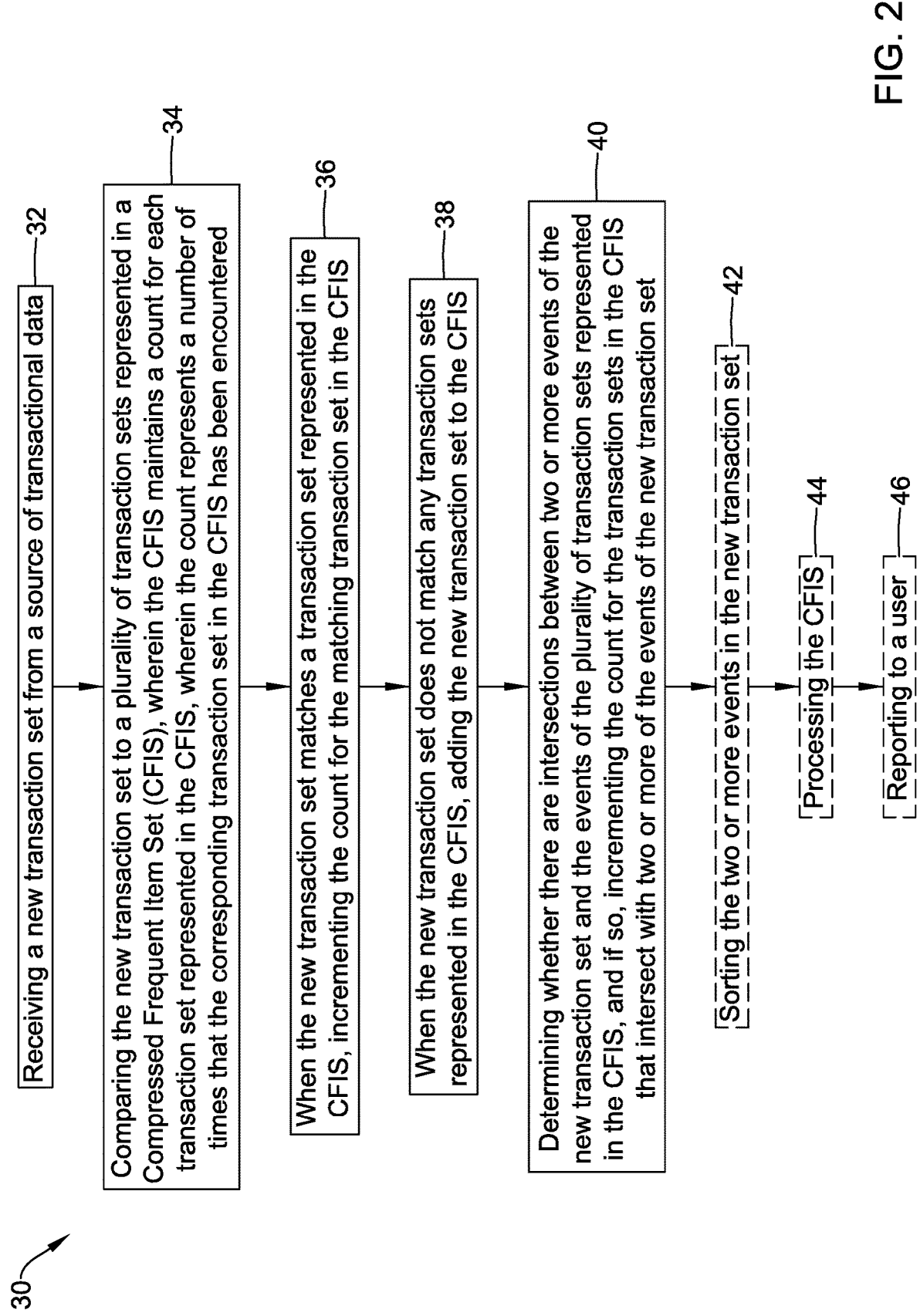
FIG. 2 is a flow diagram showing an illustrative method of analyzing transaction data that may be carried out by the illustrative transaction data analysis system of FIG. 1.

FIG. 2 is a flow diagram showing an illustrative method 30 of analyzing transactional data to find relationships between individual components of the transactional data. The transactional data may include transaction sets each including two or more events. In some cases, the transactional data may include alarm data from a Building Management System (BMS), but this is not required. A new transaction set is received from a source of transactional data, as indicated at block 32. The new transaction set is compared to a plurality of transaction sets already represented in a Compressed Frequent Item Set (CFIS), wherein the CFIS maintains a count for each transaction set represented in the CFIS, wherein the count represents a number of times that the corresponding transaction set in the CFIS has been encountered, as indicated at block 34. In some cases, each transaction set represented in the CFIS is unique.

When the new transaction set matches a transaction set represented in the CFIS, as indicated at block 36, the count for the matching transaction set in the CFIS is incremented. When the new transaction set does not match any transaction sets represented in the CFIS, as indicated at block 38, the new transaction set is added to the CFIS with an assigned count of 1.

A determination is also made as to whether there are intersections between two or more events of the new transaction set and the events of the plurality of transaction sets represented in the CFIS, as indicated at block 40. If so, the count for the transaction sets in the CFIS that intersect with two or more of the events of the new transaction set is incremented. In some cases, an intersection is determined when two or more of the events of the new transaction set match all of the events of a corresponding transaction sets represented in the CFIS. An intersection may be determined, for example, when less than all of the events of the new transaction set match all of the events of a corresponding transaction sets represented in the CFIS.

In some cases, and as optionally indicated at block 42, the method 30 may further include sorting the two or more events in the new transaction set. The two or more events in the new transaction set may be sorted in a predetermined manner. In some instances, the two or more events in each of the transaction sets represented in the CFIS may also be sorted in the predetermined manner. The predetermined manner may include, for example, sorting alphabetically and/or numerically.

In some instances, and as optionally indicated at block 44, the method 30 may further include processing the CFIS. Processing the CFIS may, for example, include sorting the transaction sets represented in the CFIS by the corresponding count. In some cases, processing the CFIS may include selecting one or more events of interest to look for within the CFIS and finding transaction sets represented in the CFIS that include the one or more events of interest, along with one or more consequent events. For each of the consequent events, a support value for the consequent event may be calculated by dividing the count of the transaction set represented in the CFIS that includes the one or more events of interest and the consequent event by a total count for all transaction sets represented in the CFIS. Also, a confidence value for the consequent event may be calculated by dividing the count of the transaction set represented in the CFIS that includes the one or more events of interest and the consequent event by the count of the transaction set represented in the CFIS that includes just the one or more events of interest.

In some cases, and as optionally indicated at block 46, the method 30 may further include reporting results to the user. This may, for example, include one or more of reporting the one or more consequent events, the support value for one or more of the one more consequent events, and the confidence value for one or more of the one or more consequent events.

Figure 3:
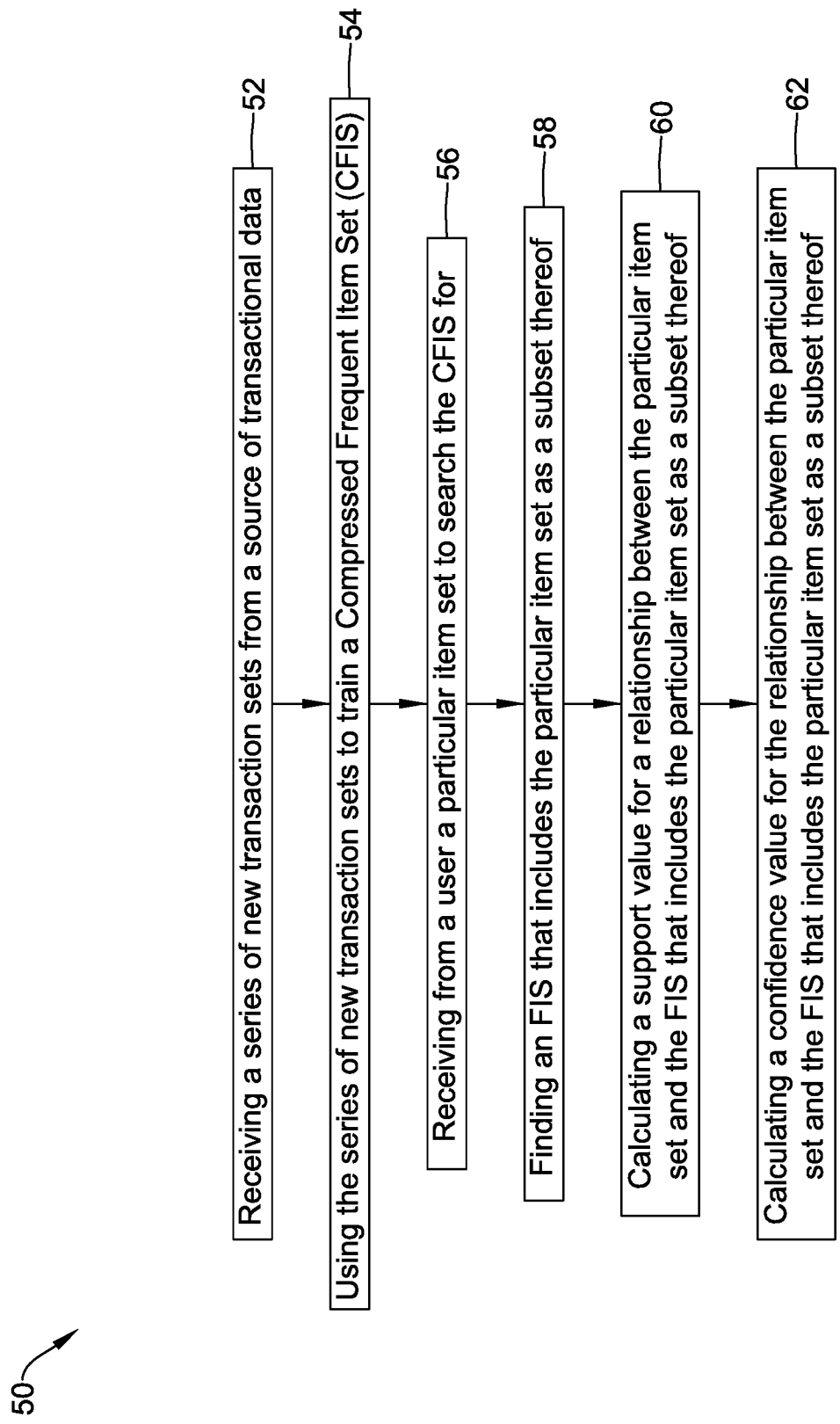
FIG. 3 is a flow diagram showing an illustrative method of analyzing transaction data that may be carried out by the illustrative transaction data analysis system of FIG. 1.

FIG. 3 is a flow diagram showing an illustrative method 50 of analyzing transactional data to find relationships between individual components of the transactional data, where the transactional data includes transaction sets and each transaction set includes two or more events. A series of new transaction sets is received from a source of transactional data, as indicated at block 52. The source of transactional data may include a Building Information Model (BIM) or a Building Management System (BMS), or from any other suitable source of transaction data (e.g. list of items purchased by each shoppers at a store). In some cases, the transactional data may include alarm data from a BMS system.

In some cases, and as indicated at block 54, the series of new transaction sets is used to train a Compressed Frequent Item Set (CFIS) that includes a series of Frequent Item Sets (FIS), where each FIS is either a unique transaction set with a frequency equal to 1 or an intersection with the unique transaction with its maximum frequency. Compressed means that there are never two FISs having the same frequency, and each FIS has a proper subset relationship. A particular Item Set to search the CFIS for is received from a user, as indicated at block 56. An FIS that includes the particular Item Set as a subset thereof is found, as indicated at block 58. A support value for a relationship between the particular Item Set and the FIS that includes the particular Item Set as a subset thereof is calculated, as indicated at block 60. A confidence value for the relationship between the particular Item Set and the FIS that includes the particular Item Set as a subset thereof is calculated, as indicated at block 62.

Figure 4:
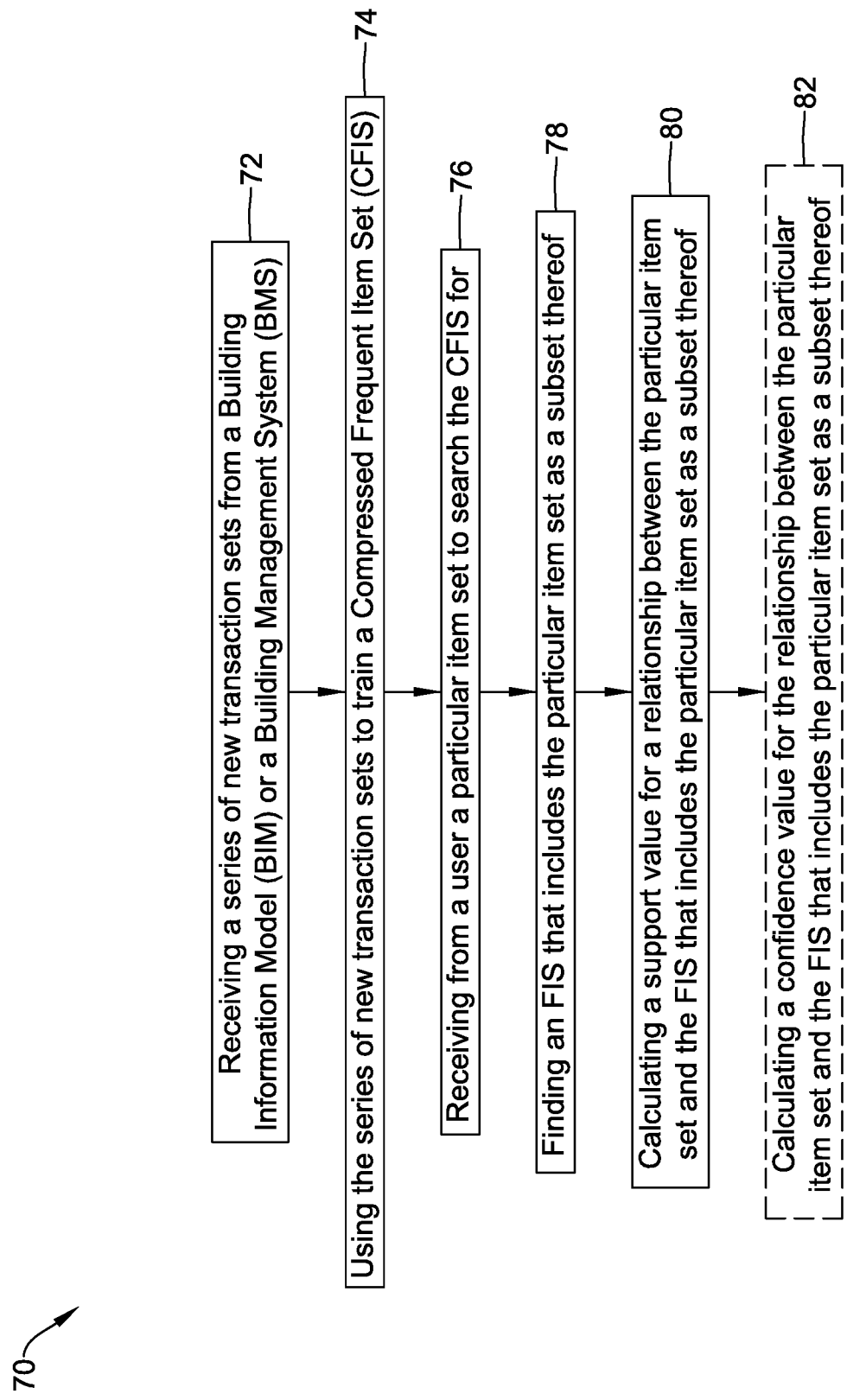
FIG. 4 is a flow diagram showing an illustrative method of analyzing transaction data that may be carried out by the illustrative transaction data analysis system of FIG. 1.

FIG. 4 is flow diagram showing an illustrative method 70 of analyzing transactional data to find relationships between individual components of the transactional data. The transactional data includes transaction sets and each transaction set includes two or more alarm events. A series of new transaction sets is received from a Building Information Model (BIM) or a Building Management System (BMS), as indicated at block 72. In some cases, and as indicated at block 74, the series of new transaction sets is used to train a Compressed Frequent Item Set (CFIS) that includes a series of Frequent Item Sets (FIS), where each FIS is either a unique transaction set with a frequency equal to 1 or an intersection with the unique transaction with its maximum frequency. Compressed means that there are never two FISs having the same frequency, and each FIS has a proper subset relationship. A particular Item Set to search the CFIS for is received, as indicated at block 76. An FIS that includes the particular Item Set as a subset thereof is found, as indicated at block 78. A support value for a relationship between the particular Item Set and the FIS that includes the particular Item Set as a subset thereof is calculated, as indicated at block 80. In some cases, and as optionally indicated at block 82, the method 70 may further include calculating a confidence value for the relationship between the particular Item Set and the FIS that includes the particular Item Set as a subset thereof.

Figure 5:
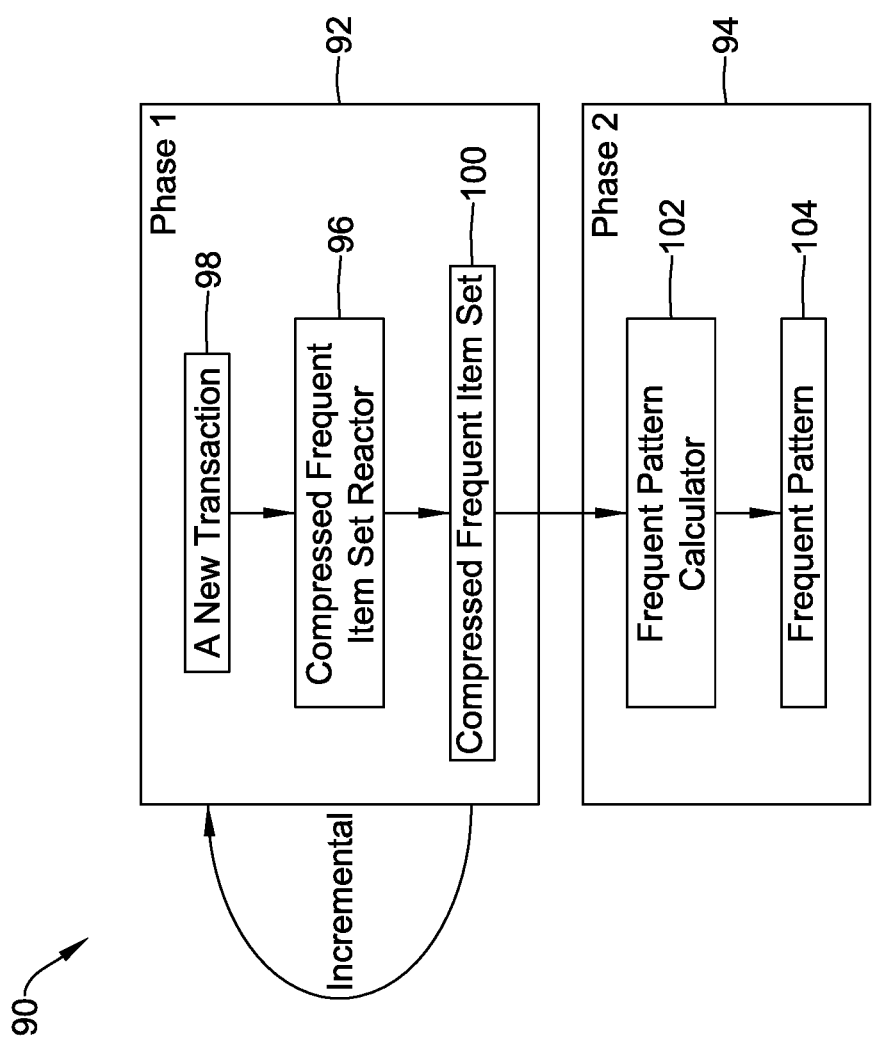
FIG. 5 is a schematic block diagram of an illustrative transaction data analysis system.

FIG. 5 is a schematic block diagram of an illustrative transaction data analysis system 90 that may be considered as an example of the data analysis system 12 shown in FIG. 1. The illustrative data analysis system 90 may be thought of as including a first phase 92 and a second phase 94. The first phase 92 involves training a Compressed Frequent Item Set Reactor 96. A new transaction 98 is fed into the Compressed Frequent Item Set Reactor 96 to produce a Compressed Frequent Item Set (CFIS) 100. This may occur incrementally, with a number of new transactions 98 fed into the Compressed Frequent Item Set Reactor 96. As each new transaction 98 is provided, the CFIS 100 is incremented to include the new transaction 98 as well as any intersections between the new transaction 98 and those already accounted for within the CFIS 100. The second phase 94 involves processing the CFIS 100 via a Frequent Pattern Calculator 102. In some cases, this includes processing the CFIS 100 looking for a particular Frequent Item Set (FIS). Any patterns found may be output as a Frequent Pattern 104.

FIGS. 6 through 13 provide a graphical representation of a simple example illustrating how the illustrative transaction data analysis system 90 may operate. In this simple example, transactions are indicated at simple combinations of letters A, B, C, D and E. Each letter may represent a particular alarm, for example, or a particular event that may occur within a building system. In another example, each letter A, B, C, D and E may represent an item purchased by a shopper at a checkout. In either cases, starting with FIG. 6, a new transaction 106, indicated as {A,C,B} is fed into the Compressed Frequent Item Set Reactor 96, as is an Old Version (of the CFIS) 108. The new transaction 106 is sorted as {A,B,C}. Changes to the CFIS are shown at 110. The changes to the CFIS shown at 110 include a newly created FIS {A,B,C}, Frequency (e.g. count) equals 1. As shown, the newly created FIS has been sorted, but this is not required in all cases. Next, a New Version (of the CFIS) 112 is created. It can be seen that the New Version (of the CFIS) 112 includes the FIS {A,B,C}, Frequency equals 1.

FIG. 7 shows pseudo code 114 that may be used in processing the first transaction 106 shown in FIG. 6 including a column 116 that shows what happens while processing the first transaction 106. As can be seen, the column 116 includes an indication 118 of the first transaction {A,C,B} 106 being sorted to {A,B,C} as well as an indication 120 that the FIS {A,B,C}, Frequency (e.g. count) equals 1 has been appended to the CFIS.

Figure 8:
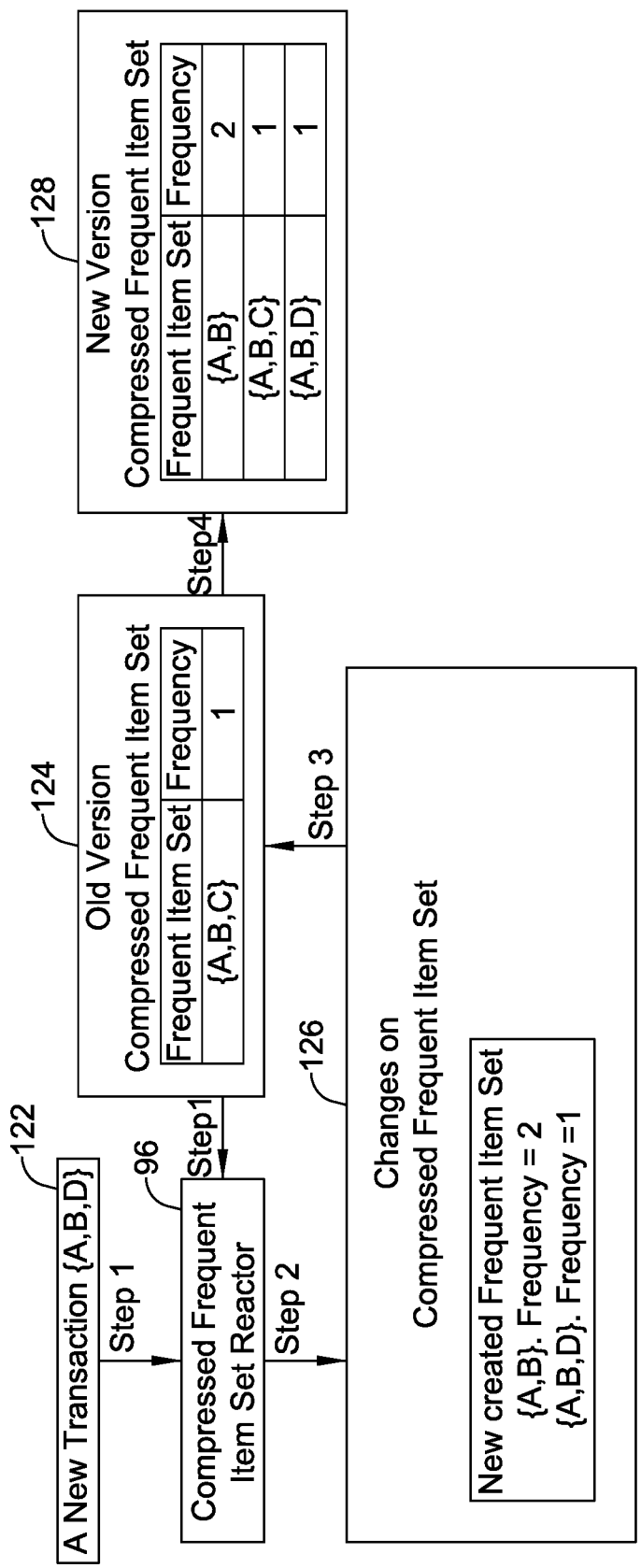
FIG. 8 is a schematic block diagram showing a second transaction in an example of transaction data analysis carried out by the illustrative transaction data analysis system of FIG. 5.

In FIG. 8, a new transaction 122, indicated as {A,B,D} is fed into the Compressed Frequent Item Set Reactor 96, as is an Old Version (of the CFIS) 124. It will be appreciated that the Old Version (of the CFIS) 124 as seen in FIG. 8 is the same as the New Version (of the CFIS) 112 shown in FIG. 6. Changes to the CFIS are shown at 126. The changes to the CFIS shown at 126 include a newly created FIS {A,B,D}, Frequency equals 1 as well as a newly created FIS {A,B}, Frequency equals 2. {A,B} is an intersection set found between only an item {A,B,C} in the FIS 112 and the new transaction {A,B,D}. Next, a New Version (of the CFIS) 128 is created. It can be seen that the New Version (of the CFIS) 128 includes the FIS {A,B}, Frequency equals 2, the FIS {A,B,C}, Frequency equals 1 and the FIS {A,B,D}, Frequency equals 1.

FIG. 9 shows pseudo code 130 that may be used in processing the new transaction 122 shown in FIG. 8 including a column 132 that shows what happens while processing the new transaction 122. As can be seen, the column 132 includes an indication 134 of {A,B,D} being compared with {A,B,C} to determine that there is an intersection {A,B}. An indication 136 shows {A,B} is not already included in the CFIS, and that there are two occurrences of {A,B} in the CFIS (occurs in both {A,B,C} and {A,B,D}). An occurrence 138 shows the new transaction {A,B,D} being added to the CFIS.

Figure 10:
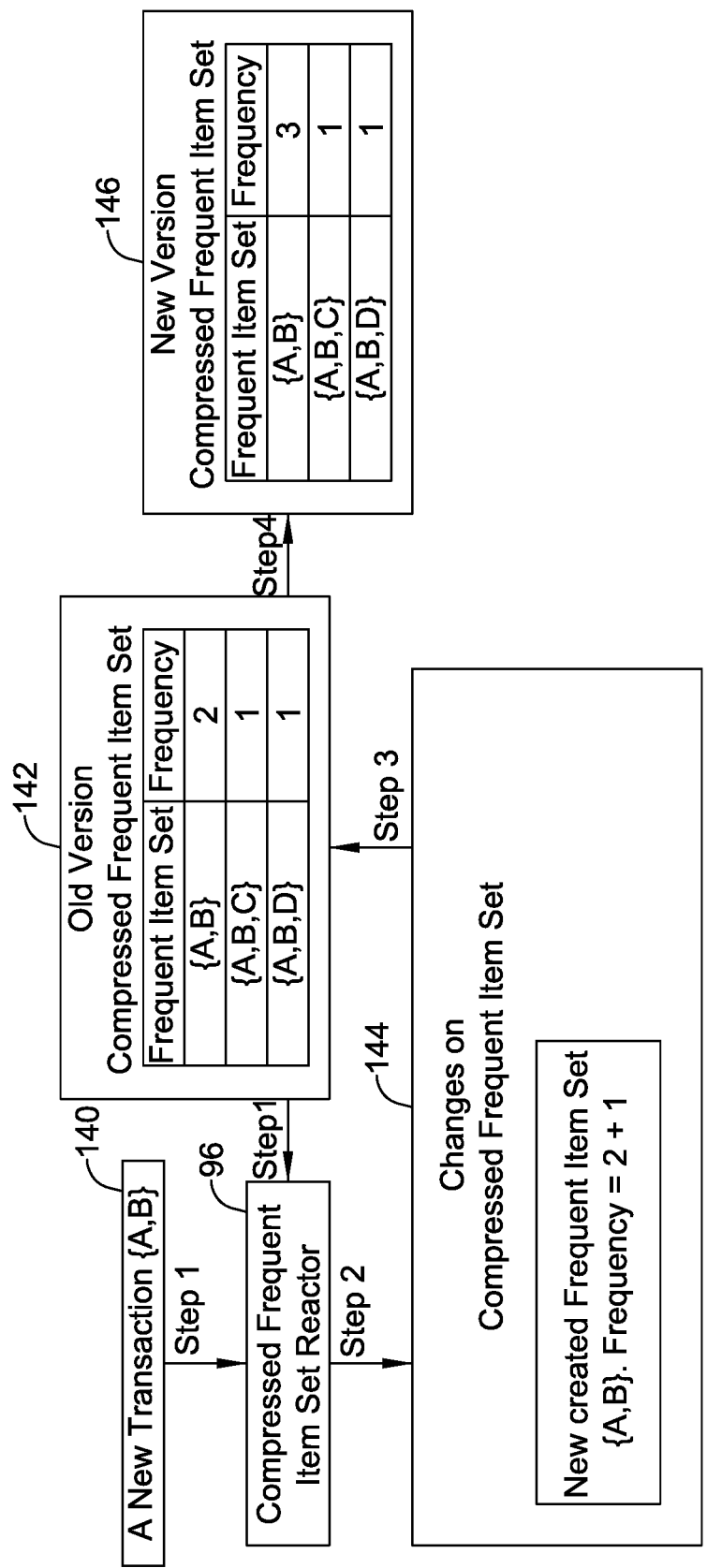
FIG. 10 is a schematic block diagram showing a third transaction in an example of transaction data analysis carried out by the illustrative transaction data analysis system of FIG. 5.

In FIG. 10, a new transaction 140, indicated as {A,B} is fed into the Compressed Frequent Item Set Reactor 96, as is an Old Version (of the CFIS) 142. It will be appreciated that the Old Version (of the CFIS) 142 as seen in FIG. 10 is the same as the New Version (of the CFIS) 128 shown in FIG. 8. Changes to the CFIS are shown at 144. The changes to the CFIS shown at 144 include incrementing the counter for the FIS {A,B}. Next, a New Version (of the CFIS) 146 is created. It can be seen that the New Version (of the CFIS) 146 includes the FIS {A,B}, Frequency equals 3, the FIS {A,B,C}, Frequency equals 1 and the FIS {A,B,D}, Frequency equals 1.

FIG. 11 shows pseudo code 148 that may be used in processing the new transaction 140 shown in FIG. 10 including a column 150 that shows what happens while processing the new transaction 140. As can be seen, the column 150 includes an indication 152 of {A,B} being compared to each of {A,B}, {A,B,C} and {A,B,D}. An indication 154 provides an example of {A,B} being compared to {A,B}, with a note that the system will loop through each of the FISs within the CFIS.

Figure 12:
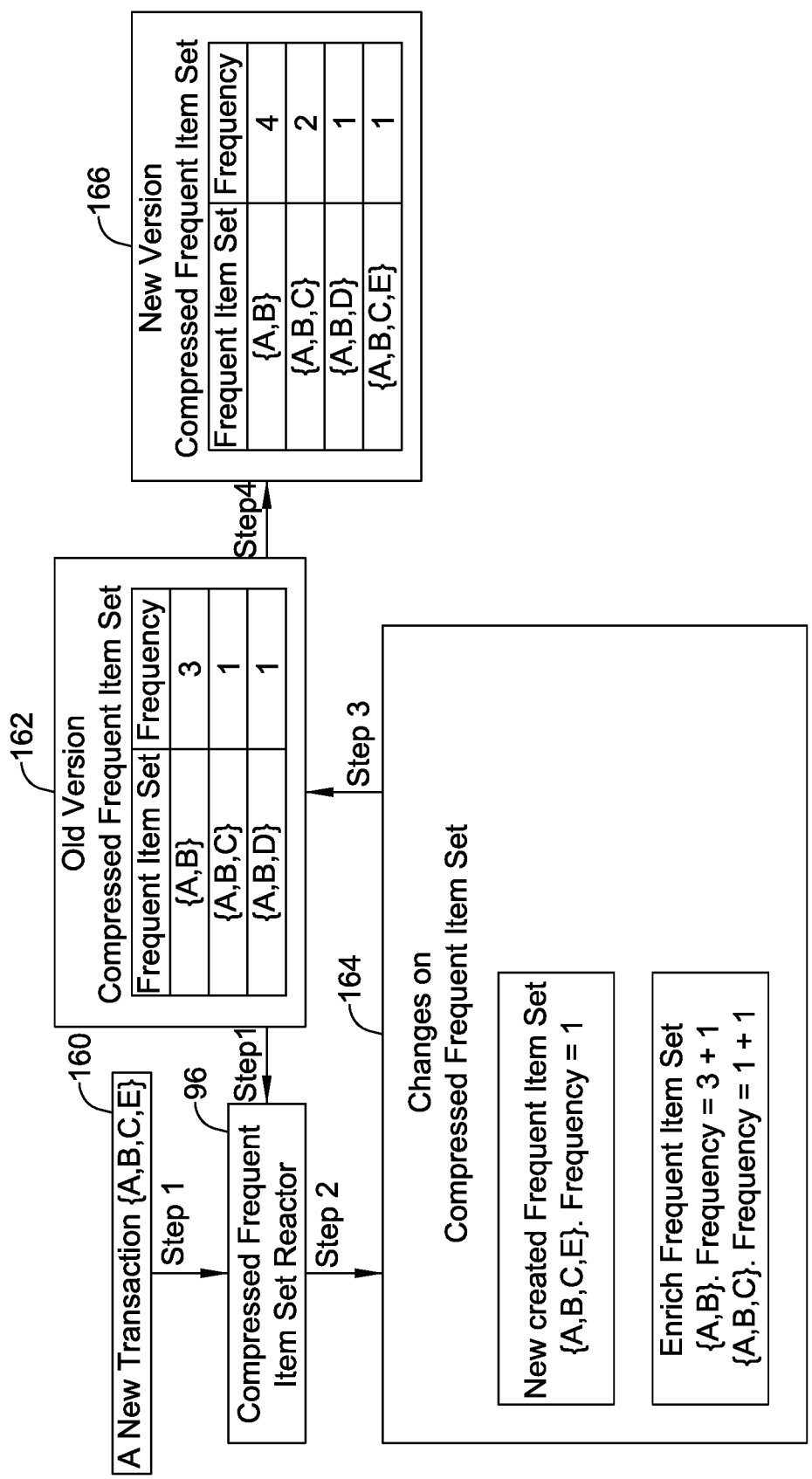
FIG. 12 is a schematic block diagram showing a fourth transaction in an example of transaction data analysis carried out by the illustrative transaction data analysis system of FIG. 5.

In FIG. 12, a new transaction 160, indicated as {A,B,C,E} is fed into the Compressed Frequent Item Set Reactor 96, as is an Old Version (of the CFIS) 162. It will be appreciated that the Old Version (of the CFIS) 162 as seen in FIG. 12 is the same as the New Version (of the CFIS) 142 shown in FIG. 10. Changes to the CFIS are shown at 164. The changes to the CFIS shown at 164 include incrementing the counter for the FIS {A,B} and {A,B,C} as well as a newly added {A,B,C,E} with a Frequency equals 1. Next, a New Version (of the CFIS) 166 is created. It can be seen that the New Version (of the CFIS) 166 includes the FIS {A,B}, Frequency equals 4, the FIS {A,B,C}, Frequency equals 2, the FIS {A,B,D}, Frequency equals 1 and the FIS {A,B,C,E}, Frequency equals 1.

FIG. 13 shows pseudo code 168 that may be used in processing the new transaction 160 shown in FIG. 12 including a column 170 that shows what happens while processing the new transaction 160. As can be seen, the column 170 includes an indication 172 of {A,B,C,E} being compared to each of {A,B}, {A,B,C} and {A,B,D}. An indication 174 provides an example of comparing the new FIS with those already present in the CFIS.

It will be appreciated that the CFIS only includes each FIS once, along with a Frequency counter. This can save tremendous amounts of memory space and processing time. Another time saver is to arrange the CFIS in order of Frequency, from highest frequency to lowest frequency. Based on Set theory, this can remove $O(n^2)$ time complexity calculations.

With reference now to the second phase 94 (FIG. 5), it is possible to generate a specific frequent pattern. Say for example that a user wants to know what is likely if a Item Set {A,B} occurs. The CFIS may be used to determine what else may occur. If a particular minimum Support parameter is set, and the CFIS is arranged in descending Frequency order, it is possible to stop searching when the Frequency is less than (total number of entries times the minimum support parameter). This also saves time.

So, the antecedent is {A,B}, and the goal is to find each of {C}, {D} and {E} as a consequence. As an example, the support and confidence for {A,B}, C may be found as follows:

$$\text{Support}(\{A, B\}, C) = \frac{\text{Occurrence}(\{A, B, C\})}{\text{All Transactions count}}$$

$$\text{Confidence}(\{A, B\}, C) = \frac{\text{Occurrence}(\{A, B, C\})}{\text{Occurrence}(\{A, B\})}$$

Given the example CFIS provided in FIGS. 6 through 11, it will be appreciated that the Support and Confidence are both 2/4, or 50 percent. So, there is a Frequent Pattern {{A, B}, C, 50%, 50%} is generated. Using the same process yields {{A, B}, D, 25%, 25%} and {{A, B}, E, 25%, 25%}.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of analyzing transactional data to find relationships between individual components of the transactional data, the transactional data including transaction sets, each transaction set including two or more events, the method comprising:
   receiving a new transaction set from a source of transactional data;
   comparing the new transaction set to a plurality of transaction sets represented in a Compressed Frequent Item Set (CFIS), wherein the CFIS maintains a count for each transaction set represented in the CFIS, wherein the count represents a number of times that the corresponding transaction set in the CFIS has been encountered;
   when the new transaction set matches a transaction set represented in the CFIS, incrementing the count for the matching transaction set in the CFIS;
   when the new transaction set does not match any transaction sets represented in the CFIS, adding the new transaction set to the CFIS; and
   determining whether there are intersections between two or more events of the new transaction set and the events of the plurality of transaction sets represented in the CFIS, and when so, incrementing the count for the transaction sets in the CFIS that intersect with two or more of the events of the new transaction set.

2. The method of claim 1, wherein an intersection is determined when two or more of the events of the new transaction set match all of the events of a corresponding transaction sets represented in the CFIS.

3. The method of claim 1, wherein an intersection is determined when less than all of the events of the new transaction set match all of the events of a corresponding transaction sets represented in the CFIS.

4. The method of claim 1, further comprising sorting the two or more events in the new transaction set.

5. The method of claim 4, wherein the two or more events in the new transaction set are sorted in a predetermined manner.

6. The method of claim 5, wherein the two or more events in each of the transaction sets represented in the CFIS are sorted in the predetermined manner.

7. The method of claim 5, wherein the predetermined manner comprises alphabetically.

8. The method of claim 5, wherein the predetermined manner comprises numerically.

9. The method of claim 1, wherein each transaction set represented in the CFIS is unique.

10. The method of claim 1, further comprising processing the CFIS.

11. The method of claim 10, where processing the CFIS includes sorting the transaction sets represented in the CFIS by the corresponding count.

12. The method of claim 10, where processing the CFIS includes:
    selecting one or more events of interest to look for within the CFIS;
    finding transaction sets represented in the CFIS that include the one or more events of interest, along with one or more consequent events;
    for each consequent event:
        calculating a support value for the consequent event by dividing, the count of the transaction set represented in the CFIS that includes the one or more events of interest and the consequent event, by a total count for all transaction sets represented in the CFIS; and
        calculating a confidence value for the consequent event by dividing, the count of the transaction set represented in the CFIS that includes the one or more events of interest and the consequent event, by the count of the transaction set represented in the CFIS that includes just the one or more events of interest.

13. The method of claim 12, further comprising reporting to a user:
    the selected one or more events;
    the one or more consequent events;
    the support value for one or more of the one or more consequent events; and
    the confidence value for one or more of the one or more consequent events.

14. The method of claim 1, wherein the transactional data comprises alarm data from a building management system (BMS).

15. A method of analyzing transactional data to find relationships between individual components of the transactional data, the transactional data including transaction sets, each transaction set including two or more events, the method comprising:
    receiving a series of new transaction sets from a source of transactional data;
    using the series of new transaction sets to train a Compressed Frequent Item Set (CFIS) that includes a series of Frequent Item Sets (FIS);
    receiving from a user a particular Item Set to search the CFIS for;
    finding an FIS that includes the particular Item Set as a subset thereof;
    calculating a support value for a relationship between the particular Item Set and the FIS that includes the particular Item Set as a subset thereof; and
    calculating a confidence value for the relationship between the particular Item Set and the FIS that includes the particular Item Set as a subset thereof.

16. The method of claim 15, wherein the source of transactional data comprises a Building Information Model (BIM) or a Building Management System (BMS).

17. The method of claim 15, wherein the transactional data comprises alarm data.

18. A method of analyzing transactional data to find relationships between individual components of the transactional data, the transactional data including transaction sets, each transaction set including two or more alarm events, the method comprising:
    receiving a series of new transaction sets from a Building Information Model (BIM) or a Building Management System (BMS);
    using the series of new transaction sets to train a Compressed Frequent Item Set (CFIS) that includes a series of Frequent Item Sets (FIS);
    receiving from a user a particular Item Set to search the CFIS for;

finding an FIS that includes the particular Item Set as a subset thereof; and calculating a support value for a relationship between the particular Item Set and the FIS that includes the particular Item Set as a subset thereof.

19. The method of claim 18, further comprising calculating a confidence value for the relationship between the particular Item Set and the FIS that includes the particular Item Set as a subset thereof.

20. The method of claim 18, wherein a source of transactional data comprises a Building Information Model (BIM) or a Building Management System (BMS).

* * * * *